May 17, 1932.  C. W. STRATFORD  1,859,010
VANE VALVE
Filed Jan. 30, 1928
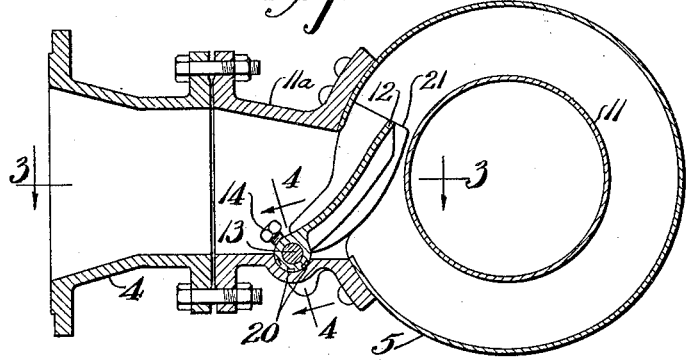
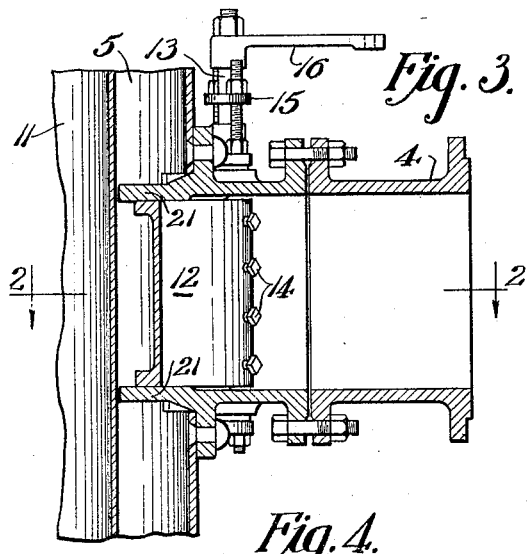
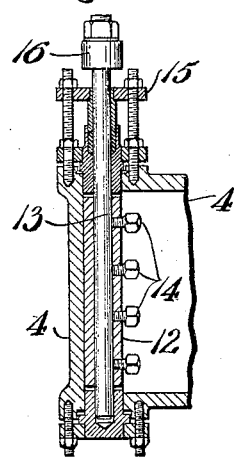
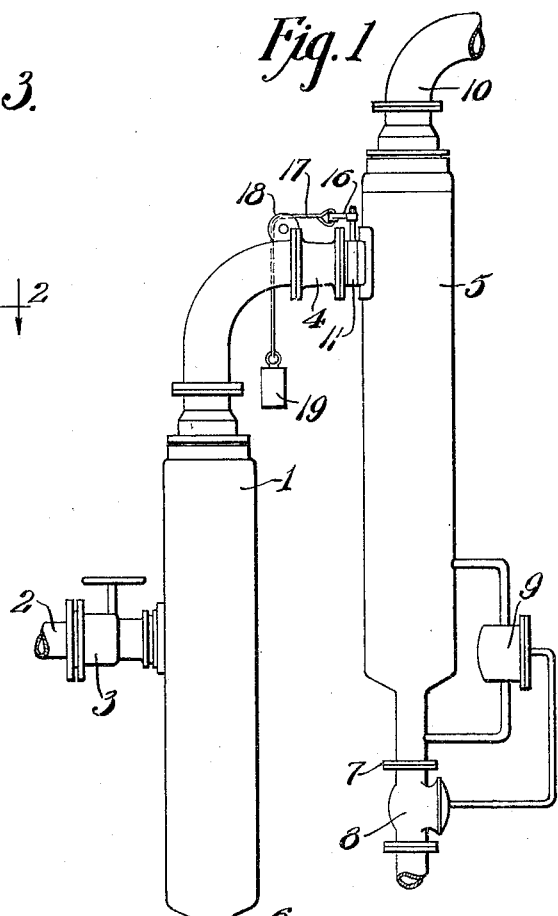
INVENTOR
Charles Walcott Stratford
BY Thomas E. Scofield
ATTORNEY

Patented May 17, 1932

1,859,010

UNITED STATES PATENT OFFICE

CHARLES WALCOTT STRATFORD, OF OAKLAND, CALIFORNIA

VANE VALVE

Application filed January 30, 1928. Serial No. 250,606.

This invention relates to improvements in vane valves and refers more particularly to a valve mechanism adapted to be installed at the mouth of an injection pipe to introduce the fluid to a cylindrical receptacle by distributing it in the form of a thin film tangentially to the inner surface of the cylinder in order to effect centrifugal separation. The invention is a continuation in part of a previous application, Serial No. 121,227 filed in the name of Charles Walcott Stratford and William S. James, dated July 8, 1926, issued as Patent No. 1,741,887, and dated December 31, 1929.

Fig. 1 is a side elevational view of separating chambers used in oil refining practice for the separation of vapors and liquids.

Fig. 2 is a view taken along the line 2—2, Fig. 3.

Fig. 3 is a view taken along the line 3—3, Fig. 2.

Fig. 4 is a view taken along the line 4—4, Fig. 2.

Referring to the drawings:

At 1 is shown a separator into which fluid is introduced through the pipe 2, in which is interposed a piston valve 3, such as that described in application, Serial No. 52,368, dated August 25, 1925, issued as Patent No. 1,741,207, and dated December 31, 1921. The top of the separator 1 is connected by a vapor pipe 4 to a second separator 5. Interposed in the vapor line 4 is the vane valve hereinafter described in detail.

Both the separators 1 and 5 have bottom draw-off flange connections 6 and 7, respectively, a diaphragm valve 8 being connected to the flange of the separator 5, which valve is automatically controlled by a liquid control mechanism, diagrammatically shown at 9.

Briefly, the fluid, including vapor and liquid, is introduced through the pipe 2 and is tangentially laid down upon the inner surface of the separator 1, where it is subjected to centrifugal separation. The separated liquid is drawn off at the bottom and the vapor with a certain amount of entrained liquid is taken off through the vapor pipe 4. This vapor is passed through the vane valve or vane closure which again disposes it as a film upon the inner surface of the separator 5 where it is for a second time subjected to centrifugal separation, the liquid gravitating to the bottom of the separator and passing off through the valve 8 while the vapor is removed from the top of the separator through a vapor line 10.

The separators here explained have been successfully used in the separation of liquid oil from oil vapor, but the mechanism is as well adapted for steam and water separation or vapors and liquids of any kind. The invention is primarily concerned with the structure of the valve by means of which the fluids are injected into the second separator 5.

This valve is a pivoted vane closure, one of the vertical edges of the valve being pivoted and a rotative tension maintained upon the valve opposed to the pressure of the fluid which is being introduced to the separator. The amount of this pressure is controlled to introduce the fluid in the form of a thin film onto the inner surface of the separator, thus the film is injected at high velocity and spun on the inner surface of the cylinder or separator so that the heavier portions cling to the outer wall and spiral downwardly to the bottom of the separator, while the vapors travel to the center of the separator and rise into the inner open bottom cylinder 11b and pass off through the vapor pipes 10 connected thereto. This inner cylinder extends into the separator to a point somewhat beyond the orifice or opening through which the fluid is injected and which is controlled by the vane valve closure.

The vane valve consists of a valve body 11a, connected by a flange joint to the vapor pipe 4 and riveted, welded or otherwise fastened by a pressure tight connection with the shell of the separator 5. Within the valve body is a vane valve 12 supported at one vertical edge on a pivot or shaft 13 which has a bearing in the valve body. The valve is fixed to the shaft or pivot by means of set screws 14. The shafting 13 extends out through the top of the valve body and is enclosed near its upper end by a stuffing box arrangement, shown in Fig. 4 at 15.

Mounted on the top of the shaft is a crank 16, shown in Fig. 1, and to this crank is attached a cord or wire 17, running over a pulley 18 and having attached to its end a weight 19. The weight which is attached to the cord may be varied in order to impose the desired amount of rotative tension upon the valve. A series of labyrinth sealing grooves 20 are cut in the rear portion of the valve surrounding the shaft to prevent any by-passing of the fluid behind the valve. The valve moves between guides 21.

In operation fluid passing from the separator 1 through the vapor line 4 contacts the front face of the vane valve and is diverted onto the inner surface of the separator 5. The pressure maintained upon the fluid through the vapor line 4 is the controlling factor as to the amount of weight necessary to hold the vane valve in a desired position to distribute the fluid properly onto the inner surface of the second separator.

It is desirable to have the film projected tangentially upon the separator so that the velocity which it attains in its spiral travel from the top to the bottom of the separator produces a substantially complete separation of the liquid from the vapor. The velocities at which the fluid is injected into the separator are dependent upon the pressure maintained upon the fluid and the rotative tension imposed upon the vane valve.

I claim as my invention:

In a centrifugal vapor liquid separator, an inner cylinder and an outer cylinder, said outer cylinder provided with an orifice, a valve body secured by a vapor-tight connection to said outer cylinder adjacent its orifice, a rotatable shaft mounted in the valve body, a vane closure for said orifice having one of its vertical edges secured thereto, a stationary vane closure guide positioned in said valve body, the closure and the stationary guide extending through the orifice of the outer cylinder into the space provided between the outer and inner cylinders.

CHARLES WALCOTT STRATFORD.